Dec. 28, 1948.  J. B. FISHER  2,457,652
INTERNAL-COMBUSTION ENGINE
Filed March 15, 1946  2 Sheets-Sheet 1

Inventor:
James B. Fisher.
By Brown, Jackson, Boettcher + Dienner
Attys.

Dec. 28, 1948.  J. B. FISHER  2,457,652
INTERNAL-COMBUSTION ENGINE
Filed March 15, 1946  2 Sheets-Sheet 2
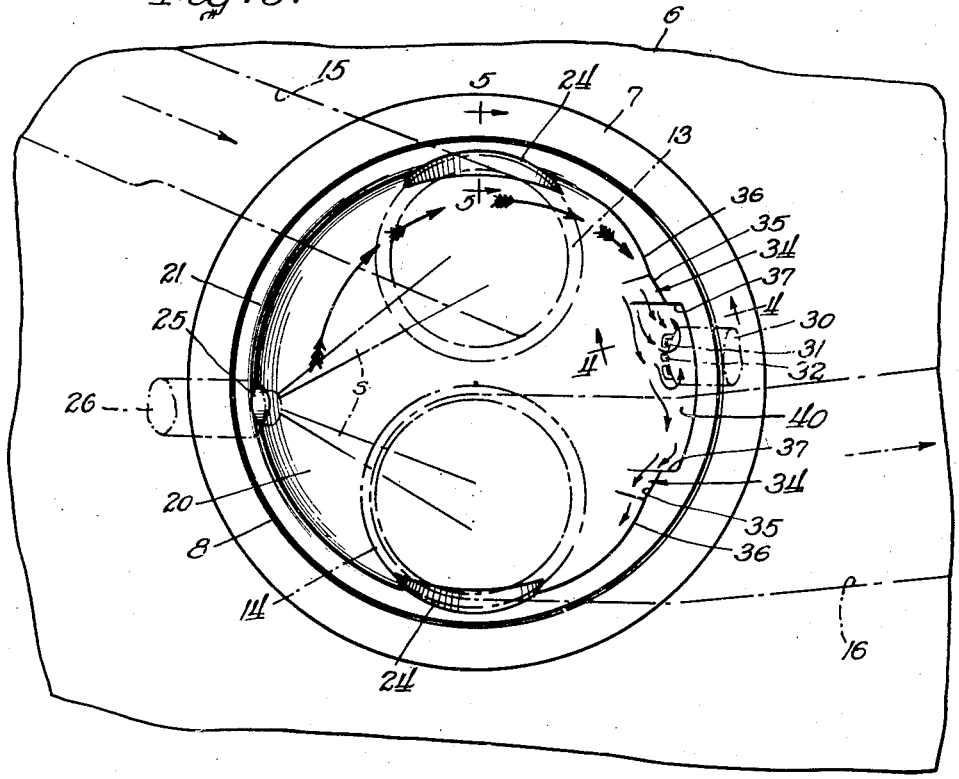
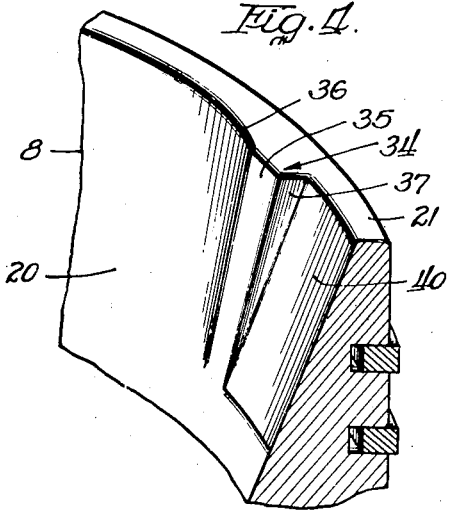
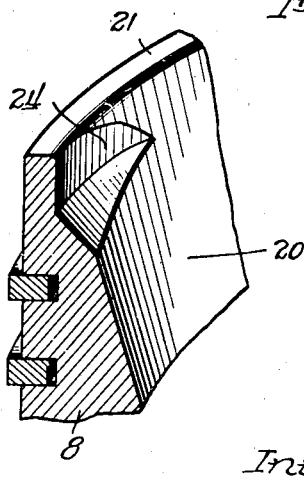
Inventor.
James B. Fisher.
By Brown, Jackson, Boettcher + Dienner. Attys.

Patented Dec. 28, 1948

2,457,652

UNITED STATES PATENT OFFICE 2,457,652

INTERNAL-COMBUSTION ENGINE

James B. Fisher, Waukesha, Wis., assignor to Waukesha Motor Company, Waukesha, Wis., a corporation of Wisconsin Application March 15, 1946, Serial No. 654,688

4 Claims. (Cl. 123—32)

This invention relates to internal combustion engines, and has to do with spark ignition injection engines.

My invention is concerned particularly with spark ignition injection engines employing solid injection, in which the piston has an open top cupped upper end portion providing with the cylinder roof a combustion chamber, as the piston approaches the end of its compression stroke, and the charging air enters the cylinder substantially tangentially thereof effective for imparting to the air charge rotation about the cylinder axis persisting substantially throughout the suction, compression and combustion strokes of the piston. The fuel is injected into the rotating air charge, at the proper point in the cycle, forming therewith the combustible fuel-air mixture charge, which continues to rotate about the cylinder axis during the compression and combusion strokes of the piston, as noted.

The known engines above referred to have proved to be highly efficient in general, but are not capable of satisfactory low speed idling and are subject to frequent missing when idling or operating under light load and at high speed. The rotation of the air charge, and with it the injected fuel, causes stratification of the fuel-air mixture, so that the heavier particles of fuel are at the radially outer portion of the charge, which then is richer at such outer portion and becomes increasingly leaner radially inward. When the engine is operating under light load or idling, but very small or minute quantities of fuel are injected. The fuel particles are thrown outward by centrifugal force into proximity to the surrounding wall of the piston cup, about which they travel in the rotation of the fuel-air mixture. Under such conditions, there is no assurance that a mixture sufficiently rich in fuel to be ignited by the spark plug will always be in sufficiently close proximity to the spark plug electrodes to assure ignition of the charge. For that reason, under the conditions stated, objectionable missing of the engine occurs. While investigations made by me appear to confirm the above explanation of the cause of missing when the engine is operating under the conditions stated, there may be other contributing factors not presently apparent. However, whether the above stated explanation is correct and complete or not, the fact is that objectionable missing of the engine occurs when idling and when operating at high speeds. The known engines referred to have been provided with means for cutting out operation of some of the cylinders, with a view to lowering the idling speed, but that involves increased expense and complication and is not altogether satisfactory.

My invention is directed to an engine of the type above referred to having simple and inexpensive means whereby the engine may be operated at materially lower idling speeds than is possible with the known engines, and objectionable missing of the engine when idling or when operating at high speed is eliminated or greatly reduced. I have discovered that, by deflecting part of the rotating fuel-air mixture charge and thereby directing a portion thereof sufficiently rich in fuel to be readily ignitible into the zone of the spark plug electrodes, assurance is had that the charge will be ignited and missing is eliminated. More specifically, I provide the piston cup with a deflector so disposed that, as the piston approaches the end of its compression stroke, part of the rotating fuel-air mixture charge is deflected from the richer area thereof into the zone of the spark plug electrodes and is there subjected to localized eddying or turbulence, assuring that fuel particles are brought into sufficiently close proximity to the spark plug electrodes to be certainly ignited thereby. Preferably, I provide two deflectors defining, in effect, a pocket opening radially outward from the combustion chamber within the piston cup and disposed substantially to receive the spark plug electrodes, when the piston is at the end of its compression stroke, or substantially so. Further objects and advantages of my invention will appear from the detail description.

In the drawings:

Figure 3 is a fragmentary plan view, on an enlarged scale, of the cylinder block and associated parts of the engine of Figure 1, taken substantially on line 3—3 of the latter figure, with the valves and the spark plug and the injection nozzle indicated in dot and dash lines;

Figure 4 is a sectional view, on an enlarged scale, of the piston, taken substantially on line 4—4 of Figure 3; and Figure 5 is a sectional view, on an enlarged scale, of the piston, taken substantially on line 5—5 of Figure 3.

Figure 1:
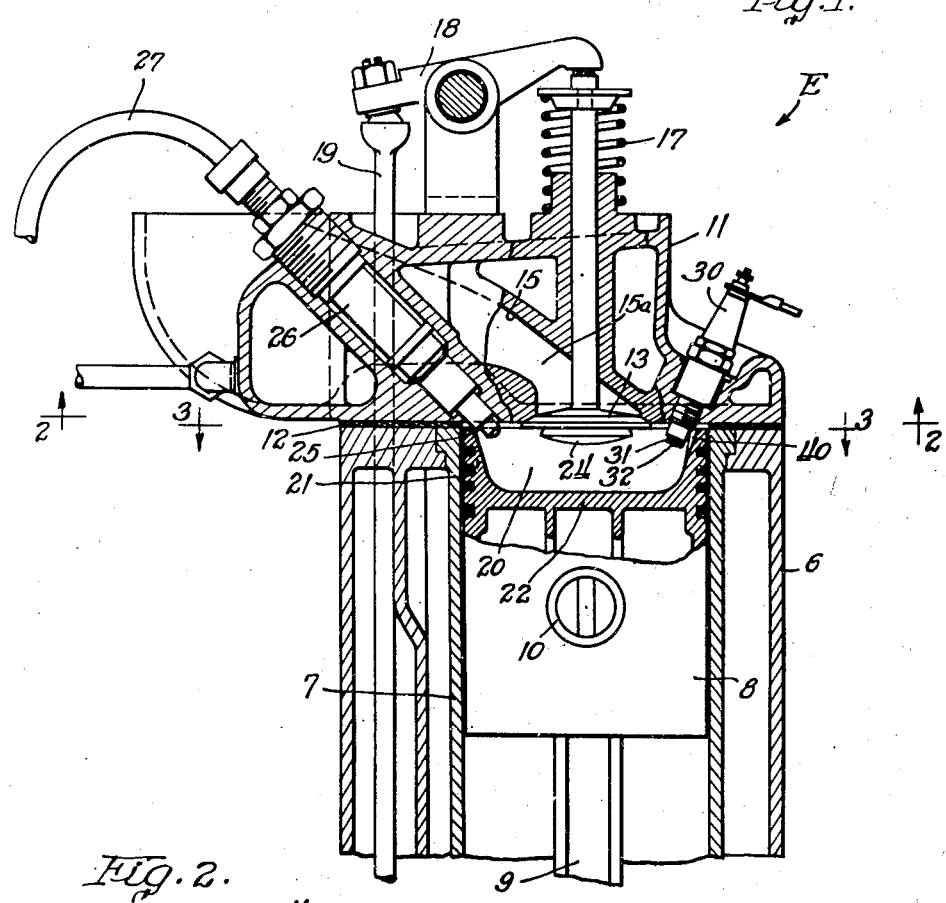
Figure 1 is an axial sectional view of the cylinder and cylinder head of a compression ignition injection engine embodying my invention, certain parts being shown in elevation and certain other parts being broken away and shown partly in section.

I have illustrated my invention, by way of example, as embodied in an engine which is, in general, of known construction and operation and a brief description of which, except as to those features having to do particularly with my invention, will suffice. The engine E comprises a cylinder block 6 in which is suitably mounted a cylinder barrel 7, with a cooling water space there about, receiving a piston 8 operating therein. The piston 8 is connected by a suitable connecting rod 9 and a wrist pin 10 to the engine crank shaft (not shown), as is known. A cylinder head 11 is bolted on the upper end of cylinder block 6, with an intervening gasket 12. The under face of cylinder head 11 is flat and overlies the cylinder 7, being provided in the cylinder area with air inlet and burnt gas exhaust ports controlled by inlet and exhaust valves 13 and 14, respectively, cylinder head 11 also having inlet and exhaust passages 15 and 16 leading to the inlet and exhaust ports, respectively. Each of the valves normally is held closed by a compression spring 17 and is opened in proper timed relation to the operation of the engine by a rocker arm 18 actuated by a push rod 19 in a known manner. The cylinder head 11 is provided with a suitable cooling water space communicating with the water space of block 6, through suitable openings in the latter and in head 11, as is known.

Figure 2:
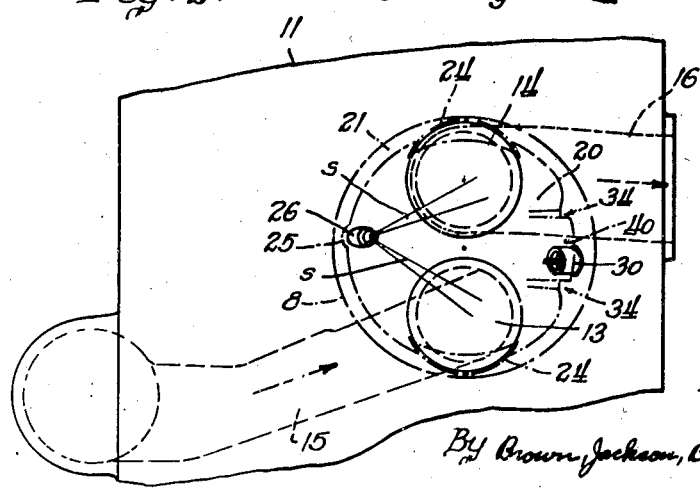
Figure 2 is a fragmentary underneath view of the cylinder head of the engine of Figure 1, taken substantially on line 2—2 of the latter figure with the upper end of the piston indicated in dot and dash lines.

The upper end portion of piston 8 is cup-shaped and open at its upper end providing with the cylinder roof, when piston 8 is in its inner or upper dead center position shown in Figure 1, a substantially cylindrical combustion chamber 20 having a circumferential wall or collar 21 extending upward from the body portion of piston 8 and a bottom closure wall 22. When piston 8 is in its position shown in Figure 1 there is but slight clearance between it and the under face of cylinder head 11, approximately equal to the thickness of the gasket 12 and only that required for mechanical reasons. The piston 8 is, of course, provided with suitable sealing rings, as shown. The collar 21 of piston 8 is provided, at opposite sides thereof, with suitable recesses 24 which accommodate the radially outer portions of the valves 13 and 14 when piston 8 is in its inner dead center position. In that connection, it will be noted that the valves 13 and 14 are disposed adjacent the sides of the cylinder and overlie, to a slight extent, at radially outer portions, the collar 21 of piston 8. That is desirable, particularly with respect to the intake valve 13, as will be explained more fully presently. If desired, the exhaust valve 14 may be disposed inward of the cylinder in non-overlying relation to collar 21 and, in such case, the recess 24 for the exhaust valve is not essential though I preferably provide two recesses 24 disposed as stated, since the pistons of certain cylinders of the engine may be disposed oppositely to the position of the piston shown in the drawings. Collar 21 of piston 8 is further provided, substantially midway between the recesses 24, with a notch 25 providing clearance, when the piston is in its inner dead center position, for the inner end portion of an injection nozzle 26 suitably mounted, in a known manner, in the cylinder head 11. This nozzle 26 is connected to a fuel pump (not shown), by a tube 27, the pump supplying fuel to the nozzle in proper timed relation to the operation of the engine, as is known. The injection nozzle 26 is of known type and is provided at its tip with two ports or openings disposed to inject two diverging sprays of fuel into the combustion chamber 20, as indicated at s in Figures 2 and 3.

As is shown, the air intake passage 15 is constricted at 15a, adjacent its inner end, and opens into the cylinder 7 substantially tangentially thereof. The constriction 15a of intake passage 15 produces a Venturi effect so that, during the intake or suction stroke of piston 8, charging air enters the cylinder 7 substantially tangentially thereof and at high velocity. That imparts to the charge rotation about the cylinder axis, which rotation persists substantially throughout the suction, compression and combustion strokes of the piston 8. As the piston 8 moves outward on its compression stroke, fuel is injected into the rotating body of charging air by the nozzle 26 and is mixed with the air. Due to the continued rotation of the body of air and the fuel now mixed therewith, the heavier particles of fuel are thrown outward by centrifugal force and travel around the combustion chamber 20, at the inner face of collar 21, the piston 8 being now approaching the end of its compression stroke. When the piston 8 is at or about the end of its compression stroke, the fuel-air mixture charge is ignited by a spark plug 30 of known type suitably mounted in the cylinder head 11 with its electrodes 31 and 32 disposed in combustion chamber 20 adjacent collar 21 thereof. In engines of the type with which my invention is concerned and of present day construction, frequent missing occurs when idling and when operating at high speed under light loads, due largely to stratification of the fuel-air charge caused by rotation thereof in the combustion chamber, as and for the reasons above explained. I avoid that difficulty by deflecting a portion of the rotating fuel-air mixture charge into the zone of the electrodes 31 and 32 of the spark plug 30.

As is shown more clearly in Figures 3 and 4, I provide the upwardly extending flange or collar 21 of the piston 8 with a deflecting element or rib 34 extending generally lengthwise of piston 8 and projecting radially inward of the combustion chamber 20. Rib 34 has a substantially flat inner face 35 connected at one side to collar 21 by a curved element 36 merging smoothly into the inner face of collar 21. Rib 34 is also provided with a substantially flat side face 37 extending from face 35, disposed substantially radially of combustion chamber 20 and tapering downward in width. Spark plug 30 is so disposed that the electrodes 31 and 32 thereof are positioned adjacent face 37 of the deflector element or rib 34, when piston 8 is at or near its inner dead center position shown in Figure 1. At that time, the fuel-air mixture charge is rotating in the combustion chamber 20 in clockwise direction, as indicated by the feathered arrows in Figure 3. The deflector element or rib 34 deflects a portion of the rotating charge radially inward of the combustion chamber 20, this deflected portion of the charge, as it passes beyond rib 34, tending to move radially outward of the combustion chamber 20, due to centrifugal force. Such outward movement tends to reverse the direction of flow of the deflected portion of the charge so that this portion is subjected to an eddying effect or localized turbulence in the zone of the electrodes of the spark plug 30, as indicated by the smaller unfeathered arrows. In that connection, it will be noted that the part of the charge deflected by the rib 34 is taken from the outer or richer area of the rotating charge. Due to the localized turbulence in the zone of the electrodes of the spark plug, assurance is had that a readily ignitible fuel-air mixture is brought into proximity to the spark plug electrodes, with the fuel particles of such mixture sufficiently close to the electrodes to assure ignition thereof by the spark plug. In that manner I assure that the fuel-air mixture charge will be ignited by the spark plug, particularly when the engine is idling or is operating at high speed and under light load. Also, by deflecting a part of the fuel-air mixture charge into the zone of the spark plug electrodes in the manner stated, the engine may be idled at much lower speed than is possible in the known engines of this type not provided with such deflector means, above referred to.

Preferably, I provide two deflector elements or ribs 34 spaced an appreciable distance apart circumferentially of collar 21. These two ribs 34 define between them an open top pocket opening freely into the combustion chamber 20 substantially radially thereof and decreasing downward in radial extent. The spark plug 30 is disposed so that the electrodes thereof are adjacent and substantially in pocket 40, when the piston 8 is at or near its top dead center position, and is adjacent the rib or deflector 34 which is the following one of such ribs with reference to the direction of rotation of the fuel-air mixture charge in the combustion chamber, to assure local turbulence in the zone of the spark plug electrodes, as and for the reasons above stated. The provision of two deflector elements or ribs 34 is not essential, since one thereof is sufficient assuming that the position of the piston with respect to the spark plug remains unchanged. In practice, however, the positions of the air intake passages and the spark plugs of certain cylinders of the engine may be reversed relative to other cylinders thereof, as is known, in which case the corresponding pistons would also be reversed. By providing two deflector elements or ribs 34, the piston 8 may be used in its position shown in Figure 3, with the intake and exhaust passages 15 and 16, respectively, disposed as there indicated, or it may be turned through an angle of 180° and used to equal advantage with intake and exhause passages reversed relative to such passages indicated in Figure 3, the positions of the injection nozzle and the spark plug being, of course, also reversed relative to their positions indicated in Figure 3. Referring further to the recesses 24 and notch 25 in collar 21, such recesses and notch have no appreciable effect upon the rotation of the fuel-air mixture charge in the combustion chamber, do not constitute elements of my instant invention and may be provided or not as conditions may require.

Comparative tests have demonstated that an engine provided with the deflector means of my invention, as above described, is highly efficient and is not subject to the objectionable missing which occurs in the known engines, above referred to, of the same general type but without the deflector means of the engine of my invention. Further, the engine of my invention will operate at a lower B. M. E. P. without throttling the intake air, than the known engines of this general type and, also, has substantially lower idling speeds than the latter engines.

As above indicated, changes in details may be resorted to without departing from the field and scope of my invention, and I intend to include all such variations, as fall within the scope of the appended claims, in this application in which the preferred form only of my invention have been disclosed.

I claim:

1. In a spark ignition injection engine in which the piston has an open top cupped upper end portion providing with the cylinder roof a combustion chamber as the piston approaches the end of its compression stroke and the charging air enters the cylinder substantially tangentially thereof effective for imparting to the air charge rotation about the cylinder axis persisting substantially throughout the suction, compression and combustion strokes of the piston; said piston having at its upper end a substantially continuous upwardly extending circumferential flange, a deflector element extending generally lengthwise of said piston and projecting from said flange substantially radially inward of said combustion chamber, and a spark plug disposed to have its electrodes adjacent the leading side of said deflector element in respect to the direction of rotation of the fuel-air charge when said piston approaches the end of its compression stroke, said deflector element being effective for deflecting inward of the combustion chamber the rotating fuel-air charge and thereby creating in conjunction with the centrifugal force tending to move said fuel-air charge outward localized eddying of the fuel-air charge at the electrodes of the spark plug.

2. In a spark ignition injection engine in which the piston has an open top cupped upper end portion providing with the cylinder roof a combustion chamber as the piston approaches the end of its compression stroke and the charging air enters the cylinder substantially tangentially thereof effective for imparting to the air charge rotation about the cylinder axis persisting substantially throughout the suction, compression and combustion strokes of the piston; said piston having at its upper end a substantially continuous upwardly extending circumferential flange and a pocket open at its radially inner side to said combustion chamber and extending substantially radially outward therefrom and closed at its radially outer side by said flange, a deflector element at each end of said pocket extending generally lengthwise of said piston and projecting from said pocket substantially radially inward of said combustion chamber and connected to said flange by a surface curved radially inward of said combustion chamber toward said deflector element and merging into said flange, and a spark plug disposed to have its electrodes substantially in said pocket when said piston approaches the end of its compression stroke.

3. A piston for use in a spark ignition injection engine in which the piston has an open top cupped upper end providing with the cylinder roof a combustion chamber as the piston approaches the end of its compression stroke and the charging air enters the cylinder substantially tangentially thereof effective for imparting to the air charge rotation about the cylinder axis persisting substantially throughout the suction, compression and combustion strokes of the piston; said piston having at its upper end a substantially continuous upwardly extending circumferential flange, and a deflector element extending generally lengthwise of said piston projecting from said flange substantially radially inward of said combustion chamber, one side of said deflector element being substantially flat and radial to said combustion chamber and the other side of said deflector element being curved inward of said combustion chamber and merging into said flange.

4. A piston for use in a spark ignition injection engine in which the piston has an open top cupped upper end providing with the cylinder roof a combustion chamber as the piston approaches the end of its compression stroke and the charging air enters the cylinder substantially tangentially thereof effective for imparting to the air charge rotation about the cylinder axis persisting substantially throughout the suction, compression and combustion strokes of the piston; said piston having at its upper end a substantially continuous upwardly extending circumferential flange, and two deflector elements extending generally lengthwise of said piston projecting from said flange substantially radially inward of said combustion chamber and spaced apart circumferentially of said flange, the opposed sides of said deflector elements being substantially flat and radial to said combustion chamber and the other sides thereof being respectively curved inward of said combustion chamber and merging into said flange.

JAMES B. FISHER.

REFERENCES CITED

The following references are of record in the file of this patent:

UNITED STATES PATENTS

| Number | Name | Date |
| --- | --- | --- |
| 1,967,243 | Hesselman | July 24, 1934 |
| 2,422,610 | Bagnulo | June 17, 1947 |